SCHMIDLIN & DRISCOLL.

Reflector for Lamps.

No. 3,817.

Reissued Feb. 1. 1870.

Witness
Lemuel W. Serrell

Inventors
Wm. G. Schmidlin
Jno. W. Driscoll

N. PETERS, Photo-Lithographer, Washington, D. C.

UNITED STATES PATENT OFFICE.

WILLIAM GUSTAVUS SCHMIDLIN AND JEREMIAH W. DRISCOLL, OF NEW YORK, N. Y.

REFLECTOR FOR LAMPS.

Specification forming part of Letters Patent No. 33,962, dated December 17, 1861; Reissue No. 3,817, dated February 1, 1870.

*To all whom it may concern:*

Be it known that we, WILLIAM GUSTAVUS SCHMIDLIN and JEREMIAH W. DRISCOLL, of the city and State of New York, have invented, made, and applied to use a certain new and useful Improvement in Reflectors for Street and other Lamps, Gas, &c.; and we do hereby declare that the following is a full, clear, and exact description of our said invention, reference being had to the annexed drawing, making part of this specification, wherein—

Figure 1:
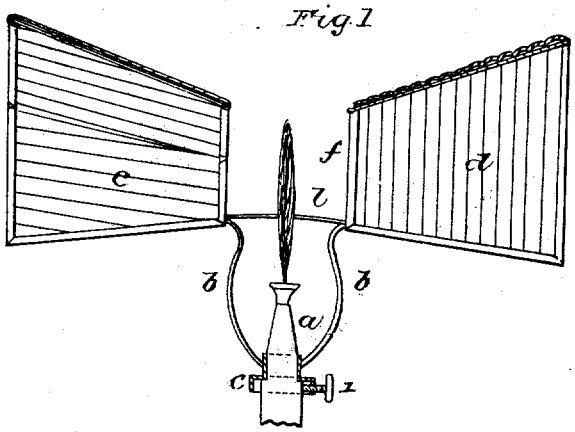
Figure 2:
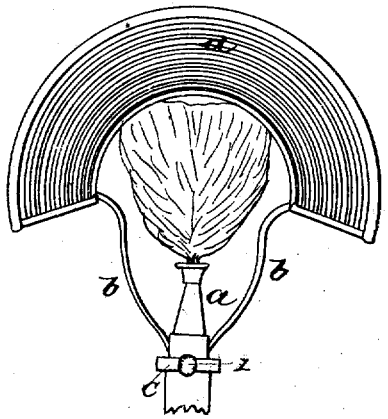
Figure 3:
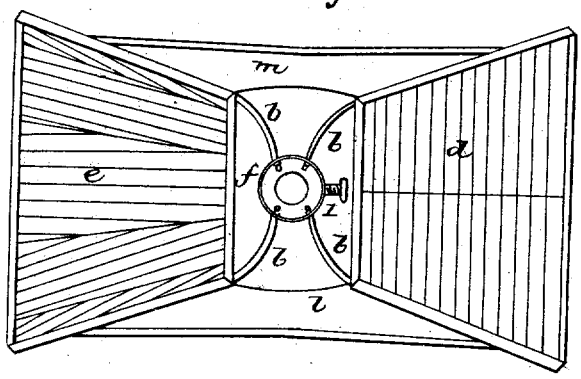

Figure 1 is a vertical section of our reflector, Fig. 2 is an end view, and Fig. 3 is an inverted plan.

Our said invention consists in a two-part flaring reflector, located in such a manner above the flame of the lamp or gas that the light is thrown off horizontally, or nearly so.

This invention is especially adapted to the lamps of streets, because the light can shine down upon the street and sidewalk; but the light heretofore wasted in shining upward is thrown off by our reflector nearly horizontally up and down the streets.

In the drawing, *a* represents the burner of any gas or other lamp. *b b* are supports from the ring *c* to the reflector *d e*. This ring *c* should be provided with the screw 1, by which the parts can be clamped to the burner and the reflector held at any desired height.

The reflectors *d e* are formed as truncated cones, or sections of a cone or pyramid, with the smallest ends toward each other. The supports *b b* are attached at these points, and hence an opening is left between the reflectors, over the flame, as at *f*.

It will now be seen that the reflectors *d* and *e* flare away from the flame, above and on opposite sides thereof, so that the light is, by the interior of these reflectors, thrown off nearly horizontally, and thus preventing the waste of light heretofore usual, particularly in street-lamps.

We have shown one of these reflectors *d* as the section of a cone and the other as the section of a pyramid, and we prefer that the reflectors be of tin, or other polished sheet metal, protected with a sheet or sheets of glass; but any other material may be employed. Where the glass is corrugated the tin should be plain, and the reverse.

The reflector which we have shown is especially adapted to the flat flame of a gas street-lamp, and generally the light requires to be reflected up and down a street, in which instance the small side reflector *l m* may be applied, not only to throw any light downward, but also to act as connections between the reflectors *d* and *e*.

In street-lamps located at corners, and others where the light is required in four directions, two more reflectors may be employed, similar to and connected with the reflectors *d e*.

Any desired character of burner may be employed with this reflector.

By the use of conical or pyramidal reflectors, placed as aforesaid, the construction is facilitated, as the sheet metal only requires to be bent, folded, or cut out, and made up instead of being stretched or drawn up by dies or hand-work into a parabolic or globular section.

We claim as our invention—

1. The reflector formed of two or more truncated conical or pyramidal sections, *d e*, flaring away from the flame, substantially as and for the purposes specified.

2. The reflectors *l m*, combined with the conical or pyramidal sectional reflectors *d e*, substantially as and for the purposes specified.

In witness whereof we have hereunto set our signatures this 4th day of October, A. D. 1869.

WM. G. SCHMIDLIN.
J. W. DRISCOLL.

Witnesses:
GEO. D. WALKER,
GEO. T. PINCKNEY.